Patented Apr. 14, 1953

2,635,084

UNITED STATES PATENT OFFICE 2,635,084

WATERPROOF SILOXANE CEMENTS

Pierre Jean Chevalier, Lyon, France, assignor to Societe des Usines Chimiques Rhone-Poulenc, Paris, France, a French body corporate No Drawing. Application November 28, 1949, Serial No. 129,882. In France December 7, 1948

11 Claims. (Cl. 260—18)

This invention relates to waterproof cements and particularly to waterproof cements based on organosilicic resins which set at room temperature.

It is an object of the present invention to provide a method whereby organosilicic resins may be caused to set at room temperature. It is a further object of the invention to provide organosilicic resin compositions which set at room temperature, in the manner of cements, and which are capable of adhering to the most varied materials.

In my copending application No. 129,881, filed on even date herewith processes are described for the production of new fluid methyl polysiloxanes which have a $CH_3:Si$ ratio of at most 1.4, which contain only 8 to 20 silicon atoms in the polysiloxane molecule and which boil between 120 and 250° C. at a pressure of 8 mm. of mercury. These new fluid methyl polysiloxanes gel at room temperature under the action of small quantities, e. g. 0.1 to 1.0% of their weight, of lead naphthenate.

The said fluid methyl polysiloxanes are produced by hydrolysing an ethereal solution of methyl halogeno-silanes having a $CH_3:Si$ ratio of at most 1.4, subjecting the product to distillation under reduced pressure and separating the fractions of a low degree of condensation which have a $CH_3:Si$ ratio of at most 1.4, which contain only 8 to 20 silicon atoms in their molecules and which boil between 120 and 250° C. at a pressure of 8 mm. of mercury.

The quantity of the fluid methyl polysiloxanes which can be separated by distillation under reduced pressure varies according to the method employed for hydrolysing the ethereal solution of methyl halogenosilanes; where the hydrolysis is effected by any of the usual methods from 10% to 20% of the fluid methyl polysiloxanes are generally obtained.

It has now been found that contrary to expectations, although fluid and only slightly condensed, the said fluid methyl polysiloxanes when employed in the place of resins in the process described in U. S. Patent application Serial No. 774,681, filed September 17, 1947, now abandoned, yield cements which set at room temperature. The substitution of the fluid methyl polysiloxanes for the methyl polysiloxane resins affords important advantages. By avoiding the use of solvents the tendency for the cements to crack or blister is reduced and owing to the fluid nature of the said products they can be readily mixed with fillers and even with considerable proportions of fillers.

According to the present invention, therefore, cements which set at room temperature comprise fluid methyl polysiloxanes which have a $CH_3:Si$ ratio of at most 1.4, which contain only 8 to 20 silicon atoms in the polysiloxane molecule and which boil between 120 and 250° C. at a pressure of 8 mm. of mercury, a filler and an organic metal derivative. The organic metal derivative may be a sodium compound but in the preferred form of the invention a metal derivative selected from the acetates, stearates and phenates of lead and lithium is preferred.

Cements of particular value are those comprising the fluid methyl polysiloxane, filler and lead acetate, those comprising the fluid methyl polysiloxane, filler and a mixture of lead stearate and lead phenate, and those comprising the fluid methyl polysiloxane, filler and lithium phenate.

The filler should, for preference, be present in sufficient proportion to make the cement composition into a thick paste.

The fluid methyl polysiloxane may be employed in its normal condition and it is unnecessary to use any solvent, with the advantage that the tendency of the cements to crack or blister is reduced.

As filler, very diverse substances such as lead monoxide, barium sulphate, calcium carbonate, silica, asbestos powder and the like may be employed either separately or in admixture.

The quantity of metal derivative required to produce setting at normal temperature is very low, proportions from 0.1 to 5.0% by weight of the fluid methyl polysiloxane generally giving satisfaction. The nature of the metal determines the electrical properties of the cement obtained. The electrical resistivity of the compositions based on lithium phenate is greater than that of compositions based on organic salts of sodium, while that of cements based on lead salts is higher still.

The mixing of the fluid methyl polysiloxane, filler and organic metal derivative can be effected in various ways; for example, the fluid methyl polysiloxane may be mixed with a sufficient quantity of filler to obtain a thick paste and the organic metal drivative may then be added. Alternatively the filler and the metal derivative may be mixed together and the mixture incorporated in the fluid methyl polysiloxane.

The cement generally sets in several hours at room temperature.

The cements obtained in accordance with the present invention are very impermeable to water vapour and are waterproof on the surface. When the metal derivative employed to accelerate the setting is suitably chosen, they also have a high electrical resistivity. These excellent properties enable them to be successfully employed in the electrical, radio-electrical, vacuum and other industries. Thus for example they can be advantageously substituted for insulating cements for sealing, based on litharge and glycerine, which are currently employed in the electrical industry and which have the disadvantage of being sensitive to moisture, as a result of which they become more or less conductive under the action of water. They can in addition be employed as coatings on electrical parts which are likely to be deteriorated by water vapour; or as protective coverings for existing cements. Moreover, the fact that the cements according to the present invention set at normal temperature permits of applying them to materials sensitive to the action of heat and in particular to papers, cardboards, woven fabrics and the like, to which they adhere excellently.

The following example will serve to illustrate the invention but is not to be regarded as limiting it in any way.

*Example*

868 parts of a mixture of methyl chlorsilanes having a $CH_3$:Si ratio equal to 1.25, are dissolved in 1050 parts of ether and the solution is poured into 2250 parts of water. The ethereal layer is separated and 390 parts of resin are isolated by distilling off the ether. The resin is then distilled under reduced pressure and 43 parts of a mixture of methyl polysiloxanes of a low degree of condensation are separated under a pressure of 8 mm. of mercury, which mixture boils from 120 to 250° C. at a pressure of 8 mm. of mercury. These fluid methyl polysiloxanes can be stored for a prolonged period without change in viscosity, whereas the crude resin, freed from the greater part of the solvents contained therein, thickens and gels on keeping for several months and sometimes gels after only a few weeks storage.

42 parts of fluid methyl polysiloxanes thus obtained are mixed with 58 parts of barium sulphate. A mixture of lead stearate and lead phenate in benzene solution is added in such quantity that the ratio lead:resin::5:1000.

The resulting cement sets in 16 hours at room temperature.

I claim:

1. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the the presence of small quantities of lead naphthenate, the said polysiloxanes being the only siloxane compounds present, a filler in proportion sufficient to make the composition a thick paste and an organic metal derivative selected from the class consisting of the acetates, stearates and phenates of lead and lithium.

2. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a filler in proportion sufficient to make the composition a thick paste and lead acetate.

3. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a filler in proportion sufficient to make the composition a thick paste and a mixture of lead stearate and lead phenate.

4. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a filler in proportion sufficient to make the composition a thick paste and lithium phenate.

5. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a mineral filler in proportion sufficient to make the composition a thick paste and an organic metal derivative selected from the class consisting of the acetates, stearates and phenates of lead and lithium.

6. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, litharge in proportion sufficient to make the composition a thick paste and lead acetate.

7. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, litharge in proportion sufficient to make the composition a thick paste and a mixture of lead stearate and lead phenate.

8. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, litharge in proportion sufficient to make the composition a thick paste and lithium phenate.

9. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a filler in proportion sufficient to make the composition a thick paste and from 0.1 to 5.0% on the weight of the fluid methyl polysiloxanes of lead acetate.

10. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a filler in proportion sufficient to make the composition a thick paste and from 0.1 to 5.0% on the weight of the fluid methyl polysiloxanes of a mixture of lead stearate and lead phenate.

11. A waterproof cement composition capable of setting at normal temperature comprising a mixture of fluid methyl polysiloxanes which have a $CH_3$:Si ratio of at most 1.4, which contain only 8 to 20 silicon atoms in the polysiloxane molecule, which mixture boils from 120 to 250° C. at a pressure of 8 mm. of mercury and which gels at room temperature in the presence of small quantities of lead naphthenate, the said polysiloxanes being the only siloxane compounds present, a filler in proportion sufficient to make the composition a thick paste and from 0.1 to 5.0% on the weight of the fluid methyl polysiloxanes of lithium phenate.

PIERRE JEAN CHEVALIER.

References Cited in the file of this patent

UNITED STATES PATENTS

| Number | Name | Date |
|---|---|---|
| 2,258,218 | Rochow | Oct. 7, 1941 |
| 2,410,737 | Jenny | Nov. 5, 1946 |
| 2,418,051 | Scott | Mar. 25, 1947 |
| 2,449,572 | Welsh | Sept. 21, 1948 |
| 2,460,795 | Warrick | Feb. 1, 1949 |
| 2,465,188 | Barry et al. | Mar. 22, 1949 |
| 2,499,865 | Iler | Mar. 7, 1950 |
| 2,526,059 | Zabel | Oct. 17, 1950 |

OTHER REFERENCES

Scott, Journ. Amer. Chem. Soc., March 1946, vol. 68, pp. 356 to 358.